Feb. 7, 1939. G. M. DEMING 2,146,333
WELDED STRUCTURE
Filed Feb. 2, 1938   2 Sheets-Sheet 1
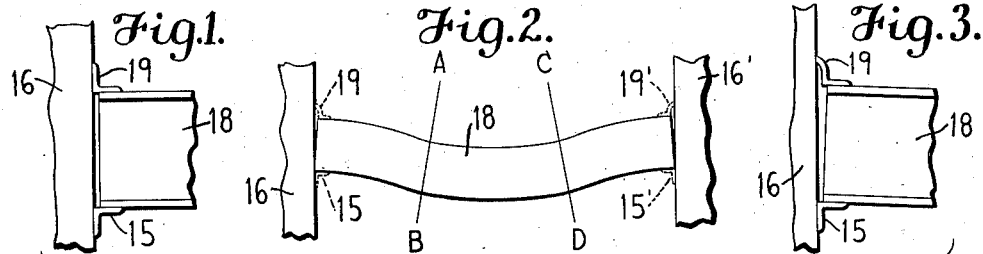
PRIOR ART
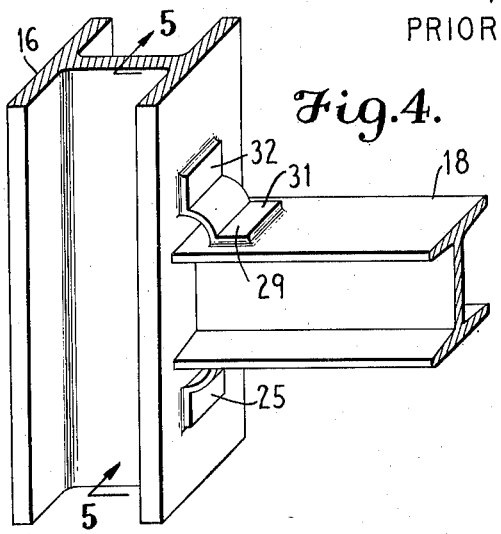
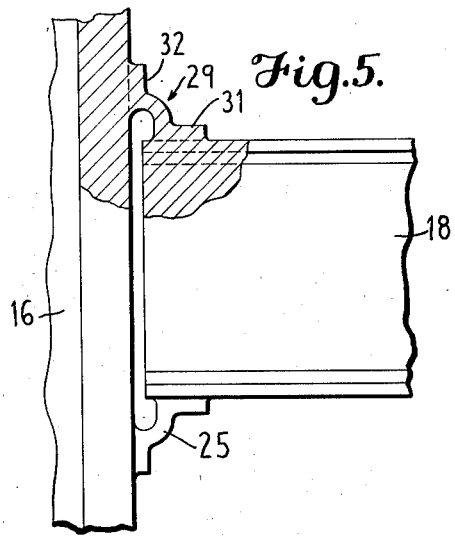
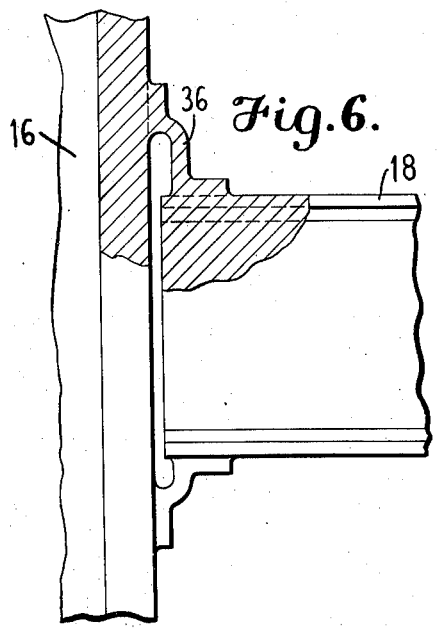
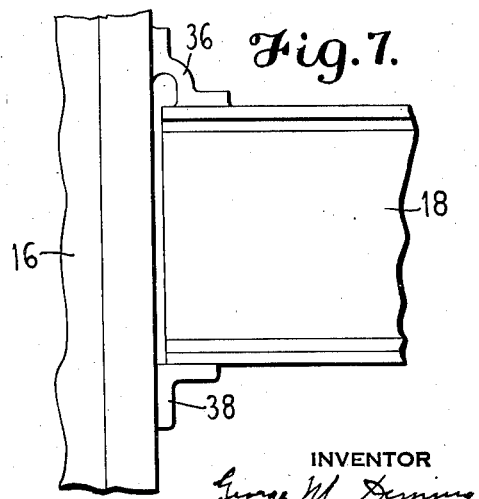
INVENTOR
George M. Deming
BY
ATTORNEY

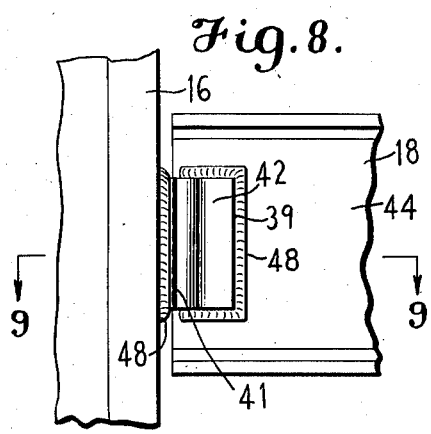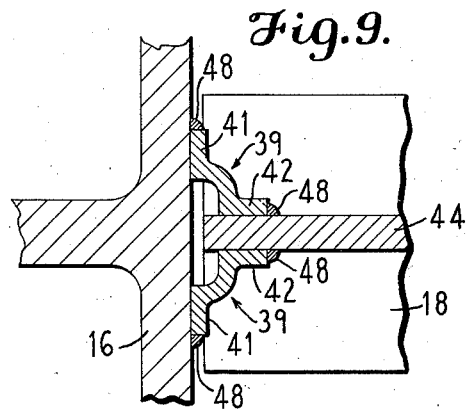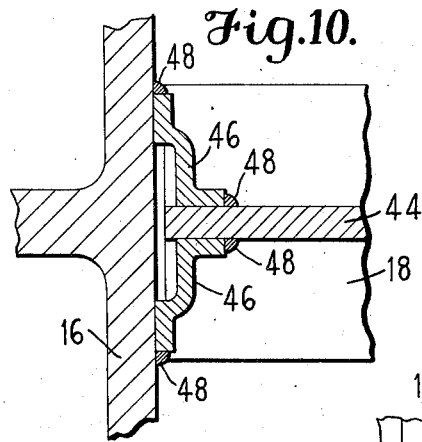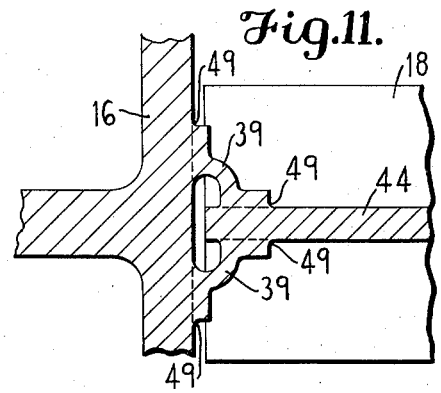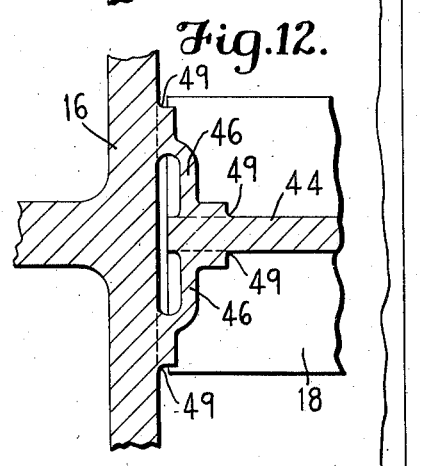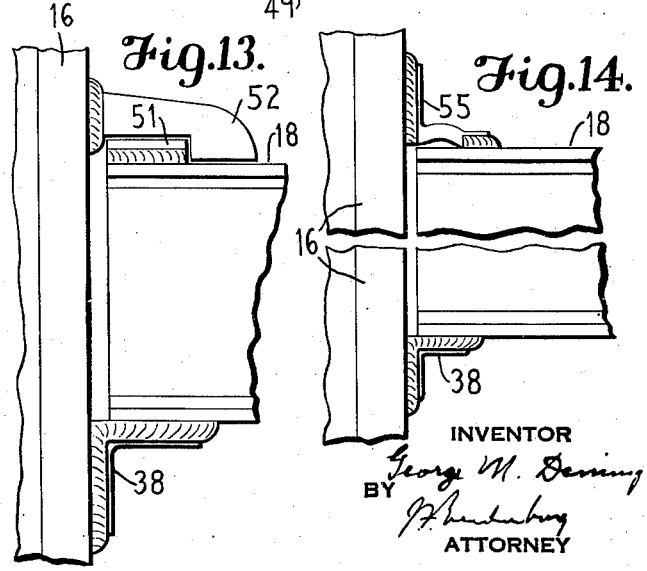

Patented Feb. 7, 1939

2,146,333

UNITED STATES PATENT OFFICE 2,146,333

WELDED STRUCTURE

George M. Deming, East Orange, N. J., assignor to Air Reduction Company, Incorporated, New York, N. Y., a corporation of New York Application February 2, 1938, Serial No. 188,238

14 Claims. (Cl. 189—36)

This invention relates to improvements in connections between metallic members, especially structural members, by a joining piece or angle welded to each of the members.

This application is a continuation in part of my copending application Serial No. 13,265, filed March 27, 1935.

All structural members used for beams tend to deflect to some extent under load, and in order to permit the beam to flex naturally under load, the connections supporting the ends of the beam must allow a slight hinging of the beam with respect to its support.

Riveted joints, even with tightly driven rivets, permit accommodation in the twisting and hinging action that occurs at the connecting angles by which beams are ordinarily connected with columns in riveted steel building construction. Advantages of substituting welding for riveting in steel structures have long been recognized, but when agles or other connecting pieces are welded instead of riveted the increased rigidity of the welded joint causes the connection to be subjected to substantial stresses other than normal shearing stresses when the beam is loaded.

It is an object of this invention to provide an improved construction for joining members, especially beams and their supports, in which the connections are made by welding. In accordance with this invention, it is possible to weld connections between structural members in steel buildings and obtain as much or more flexibility than is found in riveted connections.

Another feature of the invention relates to improved welded joint constructions for obtaining better stress distribution in the loaded beam. This result is obtained by means of connections that permit an initial deflection of the beam under load, but restrain further deflection by holding the beam ends in a manner that causes cantilever loading of the end portions of the beam.

Other objects, features and advantages of the invention will appear or be pointed out as the description proceeds.

In the accompanying drawings, forming part hereof:

Fig. 1 shows one of the ways in which beams have been connected with columns in the prior art in order to obtain a cantilever loading of the end portions of the beam;

Fig. 2 is a diagrammatic view showing the deformation of a loaded beam when the ends are restrained against longitudinal movement; the deformation is exaggerated for greater clearness;

Fig. 3 shows the breaking of the end connection when the beam of Fig. 1 is heavily loaded;

Fig. 4 is a perspective view showing a beam connected with a column in accordance with this invention;

Fig. 5 is a sectional view along the plane 5—5 of Fig. 4;

Fig. 6 is a view similar to Fig. 5 but showing a modified form of the invention;

Fig. 7 is a detail sectional view of an alternative construction that may be used in place of the seat angles of Figs. 5 and 6;

Fig. 8 is a side elevation of a beam connected with a column by an angle fastened to the web of the beam;

Fig. 9 is a sectional view along the line 9—9 of Fig. 8;

Fig. 10 is a view similar to Fig. 9, but showing a modified form of the invention;

Figs. 11 and 12 are views similar to Figs. 9 and 10, respectively, but showing other embodiments of the invention; and Figs. 13 and 14 are views showing modified forms of the invention with special provision for holding the beam end at a rather definite and predetermined value of beam flexure.

A seat angle 15 is welded to a column 16 or other supporting structure. A beam 18 rests on the seat angle 15 and is connected with it by welding. A top angle 19 has its horizontal leg welded to the top surface of the angle, and its vertical leg welded to the column so that the top of the beam is held against displacement longitudinally of the beam. Loading of the beam causes it to deflect, and the end portion of the beam moves as though it were rocking about the seat angle 15 as a fulcrum.

There is little motion at the seat angle, but even a small deflection of the beam causes a substantial movement at the top angle 19 away from the column as shown in Fig. 3. The welded connection of the top angle 19 to the column 16 can be made at the upper edge of the angle, but the difficulty is that the deformation of the top angle 19, as shown in Fig. 3, puts the high stresses of the top angle in close proximity to the weld and the weld is strained beyond the yield point of the weld metal when the beam is loaded only to its normal working capacity.

Fig. 2 shows the beam 18 resting on seat angles 15, 15' which are connected to columns 16 and 16'. As long as the top of the beam 18 is held against lateral movement by top angles 19 and 19' connected to the beam and to the columns 16 and 16', respectively, the ends of the beam will be loaded as cantilevers. For example, the left-hand end of the beam as far as the line A—B acts as a cantilever beam, and so does the right-hand end of the beam as far as the line C—D.

The points where the lines A—B and C—D intersect the beam 18 in Fig. 2 are points of inflection, that is, the curve of the loaded beam has its concavity downward to the right of the line C—D and to the left of the line A—B, but upward between those lines. By imposing sufficient end restraint it is possible to bring the points of inflection sufficiently close together so that the bending moment imposed at the center of the beam for a given load is quite limited. Consequently, it is possible to employ a lighter beam section than otherwise.

If the end restraint were entirely rigid, the beam would be excessively stressed in the vicinity of the top angle connections. It is preferable to permit a certain yielding of the top angle so that the tendency for the beam to fail at the center is greater than the tendency to fail at the end connections.

Fig. 4 shows a welded joint embodying my invention. The beam 18 rests on and is welded to a seat angle 25 which is welded to the column 16. A top angle 29 has an end portion 31 which contacts with the top of the beam 18, and an opposite end portion 32 in contact with the flange of the column 16 or other supporting means. The intermediate part of the angle between the end portions 31 and 32 includes an offset portion that is so shaped and of such section that it is semi-rigid and imparts a certain flexibility to the angle.

The end portion 31 is welded to the beam 18 by either a surface-fushion weld or by a fillet weld along the edges of the portion 31, and the other end portion 32 of the angle 29 is similarly welded to the column 16.

The expression "fillet weld" as used herein means a weld made along the edge of a joining piece and the part to which it is to be connected, with metal usually added from a rod to build up the weld. Fillet welds can be made with various heating instrumentalities, such as a gas torch, carbon arc, or depositing electrode. The expression "fillet weld" is used to distinguish from "interfacial bonding" or "surface fusion welds" in which parts are welded together over all or a substantial part of their areas of contact.

When the beam 18 in Fig. 4 is loaded, the angle 29 permits the beam to bend, but at a rather definite and predetermined value of beam flexure the end restraint rises to a sufficiently high value to obtain the theoretically ideal stress distribution such as roughly illustrated in Fig. 2.

While the seat angle 25 is similar to the top angle 29 in Fig. 4 the fact that the movement of the beam is so much less at the seat angle makes it unnecessary for both of these angles to possess equal flexibility. Fig. 6 shows a top angle 36 in which greater flexibility is obtained by more widely spaced limbs than in the angle 29, the upper portion being more remote from the line of intersection of the angle. The expression "line of intersection" denotes the line at which the contact faces of the angle would intersect if extended, and it is also the line on which the top face of the beam would intersect the side face of the column if sufficiently extended. This "line of intersection" corresponds to the "vertex" of a plane angle.

Fig. 7 shows a conventional seat angle 38. If the top angle possesses the necessary flexibility, the seat angle can in most cases be of the type shown in Fig. 7 because there is so little movement at the lower flange of the beam.

Besides the connections shown in Figs. 1–7 in which the top angle is secured to the upper flange of the beam, there is another type of connection such as shown in Figs. 8 to 12. In these views the beam 18 is joined to the column 16 by an angle or joining piece 39 that has an end portion 41 welded to the face of the column and an end portion 42 welded to the web 44 of the beam 18. Similar angles 39 are used on both sides of the web as shown in Fig. 9.

In general, the top angle construction shown in Fig. 4 permits greater restraint with lighter angle sections, but the deformation involved for the top angle construction is greater than in the case of the side angle construction illustrated in Fig. 8.

The joining piece 39 is similar in construction to the angle 29 and has its end portions connected by an intermediate part which gives flexibility to the connection. Where greater flexibility is desired, angles 46 (Fig. 10) with more widely spaced limbs may be used in place of the angles 39.

Figs. 8–10 show the joining pieces 39 and 46 connected to both the column and beam by fillet welds 48 along the edges of the end portions of the angles 39 and 46.

In Figs. 11 and 12 the joining pieces 39 and 46 are shown connected with the column 16 and the web 44 of the beam by surface fusion welds that bond the angles to the web and column over substantially the entire area of contact of the angles with the web and column. These surface fusion welds may be made by the method described in my aforementioned Patent 2,053,216. The metal of the surfaces to be joined is quickly heated to fusion by the direct application of numerous flames of sufficient temperature preferably of a mixture containing oxygen and acetylene.

While the surfaces of the angle and those of the beam and column to which the angle is to be bonded are being simultaneously heated, the parts are in proximity so that when the surfaces reach a molten state and the flame heat is removed the angle can be thrust quickly into position in contact with the beam and column, and with sufficient force to overcome any irregularities and insure that the fluid areas coalesce.

The strength of the weld is increased by marginal formations 49 having the effect of fillets, these being produced by melting enough metal so that there is an excess to be squeezed out beyond the edges of the angle when the latter is thrust into position against the surfaces of the beam and column.

In Fig. 13 the beam 18 rests on the seat angle 38 to which it is connected by welding, either fillet or interfacial. In place of the top angle, there is a block 51 extending entirely across, or for a substantial distance across, the top flange of the beam 18. This block is welded to the flange. A hook member 52 is welded to the column 16 at one end and extends across the top of and down in front of the block 51. The width of the member 52 is preferably equal to that of the block 51. There is enough clearance between the hook member 52 and the front face of the block 51 to permit the beam 18 to flex under load until the flexure becomes sufficient to cause the block 51 to come against the hook member 52.

The amount of flexure required to cause this contact of the block and hook member depends upon the original clearance between the block and hook. This clearance may be worked out for the particular beam so that the end restraint to produce cantilever loading of the end portions, as in Fig. 2, will occur with a given loading of the beam. The hook and block of Fig. 13 may be located along the web of the beam instead of across the flange.

Fig. 14 shows a top angle 55 with a crimped horizontal leg welded to the beam 18 on that side of the crimp remote from the other leg of the angle. The vertical leg of the angle 55 is not crimped and is welded to the column 16 by either fillet or interfacial welds. When the beam 18 is initially loaded, the crimp in the horizontal leg of angle 55 flattens out and while it is doing so the angle offers little restraint to hinging of the beam end about its seat angle 38. As soon as the crimp has been pulled out substantially flat, the angle 55 suddenly restrains the end of the beam 18 and causes cantilever loading of the beam in the manner shown in Fig. 2. The degree of flexure at which the angle 55 becomes a substantial restraint depends upon the amount of crimping and can be controlled by the original design of the crimped leg of the angle. The crimp in the angle 55 is a portion offset from the region of the beam weld when the connection is in an unstressed condition. The semi-rigid portions of the angles shown in Figs. 4–12 are offset from both weld regions regardless of the stressing of the connections, but the crimp offset of Fig. 14 flattens as the stress increases.

Although the invention has been described as embodied in a connection between a beam and a column, it will be understood that it is not limited to such connections but may be applied generally to connections where some hinge action under load is advantageous. Terms of orientation are, of course, relative, because the connections may be in structures such as bridge trusses where the forces are such that the angle corresponding to the seat angle here described may be above the "top" angle. Various changes and modifications can be made in the illustrated embodiments of the invention, and some features may be used without others without departing from the invention as defined in the claims.

I claim:

1. A welded connection between two metallic structural members, one of which is subject to deflection under load, including a joining piece welded to both of said members, and having an intermediate semi-rigid portion offset from a welded region in the unstressed condition of the connection, and capable of yielding within its elastic limit to prevent undue stressing of the connection when the beam is deflected by the load.

2. In a firm connection between structural members of a steel building, an angle with spread limbs, each of said limbs being welded to one of the metallic structural members, and the portion of the angle between the spread limbs being of such a nature that it imparts sufficient flexibility to the connection to protect the welds from breaking strains.

3. In a welded connection between structural members that are in such relation that the web of one structural member is behind the surface at the region where the connection is made and stiffens the surface so as to prevent the distortion necessary for hinge action in the joint, the improvement which comprises a joining piece with end portions welded to the respective structural members, and a semi-rigid portion that is offset from the region of the welds in the unstressed condition of the connection and that bends to impart a limited flexibility to the joining piece to protect the welds from breaking strains.

4. A connection between a beam and column comprising an angle with spread limbs in such relation that a face of one limb contacts with a surface of the column and a face of the other limb contacts with a surface of the beam, at least one of the regions of such contact being spaced from the line at which said surfaces would meet if sufficiently extended, the beam and column being welded to the respective limbs of the angle with which they are in contact, and said angle including a semi-rigid portion between said faces.

5. A welded connection between a beam and a rigid supporting member including a seat on said supporting member in position to support the beam, and an angle at the top of the beam welded to the beam and to said support in such relation that it restrains the longitudinal movement of the beam and results in a cantilever loading of the end of the beam, said angle having a semi-rigid portion between the welds and offset from a weld region in the unstressed condition of the connection, said semi-rigid portion being constructed and arranged to give the desired flexibility to the joint without exceeding the elastic limit of said angle.

6. A connection between a beam and a column or the like, comprising a seat member attached to the column, and on which the beam rests, and to which the beam is welded, and an angle at the top of the beam connecting the top of the beam with the column, said angle contacting with the column at a region spaced from the beam and being welded to the column by a fillet weld along the edge of the area of contact of the angle with the beam, and said angle being welded also to the beam and having a semi-rigid portion offset from a weld region in the unstressed condition of the connection, said semi-rigid portion being located between said fillet weld and the connection with the beam, with sufficient flexibility to protect the fillet weld from undue stress caused by flexing of the beam.

7. Means connecting a column and a beam including a seat angle on which the beam rests, said seat angle being connected with the column and the beam by welding, and an angle at the top of the beam with spread limbs separated by a semi-rigid section and in such relation that they contact with the column and beam at regions spaced from the line at which the top surface of the beam would intersect the column if said top surface were extended, the limbs of the angle being welded to the beam and column by fillet welds along the edges of the limbs at the regions of contact.

8. A connection between a beam and a supporting member comprising an angle connected with the supporting member and contacting with the web of the beam and welded to the beam by fillet welds along the edge of that part of the angle that contacts with the web, said angle having an offset portion that imparts limited flexibility to the connection in response to bending of the beam, and the connections of the angle with the supporting member and web being spaced from the region where the web, if extended, would intersect the supporting member.

9. In a connection between a beam and a supporting member by a joining angle, the improvement which comprises an angle with spread limbs one of which contacts with the web of the beam and the other with the supporting member at regions remote from the line of intersection of the angle, and an intermediate semi-rigid portion between the limbs giving the desired flexibility to the angle, the limbs of said angle being welded to the supporting member and to the web of the beam.

10. A welded connection between a beam and column including connecting members welded to the beam and column, said connecting members including means supporting the beam, and restraining means welded to the beam and column above said supporting means, at least one of said restraining means having an intermediate portion between the welds and offset from a weld region in the unstressed condition of the connection, said portion being constructed and arranged to bend within its elastic limit as the beam deflects and to limit the deflection of the beam by effecting a substantially greater restraint of the movement of the end portions of the beam as the deflection of the beam increases, thereby causing said end portions to support the load with a cantilever action.

11. A welded connection between a beam and column including a seat member connected to the column and on which the beam rests, and to which the beam is welded, a block connected to the beam, and a hook connected to the beam at some distance above the seat member, said block and hook being in such relation that there is a clearance between them when the beam is not loaded but they come into contact as the beam is loaded and restrain bending of the beam.

12. Means for making a welded connection between two angularly related structural members of a steel building frame, comprising a filler block having two joining faces in angular relation to be united by interfacial bonds with the members to be connected, said filler block being of sufficient strength to connect said structural members in the steel building frame, and having limbs spaced from one another by an intermediate portion that yields under heavy loading, said limbs being formed with broad terminals carrying said joining faces.

13. A welded joint between two angularly related structural members of a steel building frame, said joint comprising a filler block having areas which are in the same angular relation as the members and united to said members by interfacial fusion bonds, the filler block being so shaped that at least one of the bonding areas terminates at a substantial distance from the line at which said areas would meet if extended, and an intermediate portion of the filler block of such a nature that it yields to permit the joint to flex.

14. A metallic building structure comprising a column and a beam in angular relation, and a filler block having limbs one of which has a broad area united to the column by an interfacial fusion bond, and the other of which has a broad area similarly united to the beam, said limbs being spaced so that the bonding areas terminate at a substantial distance from the line at which said areas would meet if extended.

GEORGE M. DEMING.